United States Patent
Wheeler et al.

[19]

[11] Patent Number: 6,136,176
[45] Date of Patent: Oct. 24, 2000

[54] CAPACITOR WITH CONDUCTIVE POLYMER

[75] Inventors: David Alexander Wheeler, Williamston; Philip Michael Lessner, Simpsonville, both of S.C.

[73] Assignee: Kemet Electronics Corporation, Greenville, S.C.

[21] Appl. No.: 09/315,960

[22] Filed: May 21, 1999

[51] Int. Cl.$^7$ .................................................. C25D 11/08
[52] U.S. Cl. .......................... 205/328; 205/171; 205/224; 205/229; 361/508; 361/509; 361/528; 361/529
[58] Field of Search ..................................... 205/171, 224, 205/229, 328; 361/508, 509, 528, 529

[56] References Cited

U.S. PATENT DOCUMENTS

| | | |
|---|---|---|
| 4,785,380 | 11/1988 | Harakawa et al. . |
| 5,428,500 | 6/1995 | Nishiyama et al. . |
| 5,436,796 | 7/1995 | Abe et al. . |
| 5,455,736 | 10/1995 | Nishiyama et al. . |
| 5,461,537 | 10/1995 | Kobayashi et al. . |
| 5,473,503 | 12/1995 | Sakata et al. . |
| 5,567,209 | 10/1996 | Kobayashi et al. . |
| 5,567,356 | 10/1996 | Kinlen . |
| 5,586,000 | 12/1996 | Sakata et al. . |
| 5,586,001 | 12/1996 | Amano et al. . |
| 5,621,608 | 4/1997 | Arai et al. . |
| 6,001,281 | 12/1999 | Lessner et al. ................... 252/500 |

OTHER PUBLICATIONS

Thomas S. Gore, Jr., Capacitors, Discrete Circuit Components, date unknown.

Monsanto, XICP–OS01 Experimental Product Data Sheet, dated Jul. 1996.

*Primary Examiner*—Kathryn Gorgos
*Assistant Examiner*—Christopher M. Keehan
*Attorney, Agent, or Firm*—Banner & Witcoff, Ltd.

[57] ABSTRACT

Capacitor elements made with a solid polymeric electrolyte show reduced leakage current when reformed at about 60–85% of formation voltage during the impregnation phase between successive layers of polymeric electrolyte.

15 Claims, 1 Drawing Sheet

CAPACITOR WITH CONDUCTIVE POLYMER

FIELD OF THE INVENTION

The invention relates to a valve metal capacitor made with a doped polymeric counter electrode and its method of manufacture.

BACKGROUND OF THE INVENTION

Contemporary capacitors have a layered structure that starts with a valve metal or film, usually of aluminum or tantalum. The surface of that film is typically oxidized under controlled conditions ("anodizing") to form a high surface area dielectric layer made of the oxidized anode metal. A solid counter electrode is applied over the dielectric, and a metal electrode formed on the counter electrode.

Tantalum capacitors are often made from sintered powder compacts and suspended in an electrolyte solution, i.e., anodized, under appropriate current density to produce the anodic oxide dielectric. This anodizing step may be carried out at a temperature up to about 95° C. in an electrolyte which typically consists of a dilute aqueous or mixed aqueous/ethylene glycol solution of a mineral acid or a salt of a mineral acid (e.g., phosphoric, sulfuric, nitric or hydrochloric acid) at an applied voltage that is 3–4 times the rated voltage of the part. Electrolytes which tend to give the best results (i.e., highest dielectric quality) often contain 50–60 vol % ethylene glycol or polyethylene glycol and 0.5 to 2 or more vol % phosphoric acid and are maintained at a temperature between 80° and 90° C. The purpose of the anodizing process is the formation of a solid dielectric layer on the surface of the anode. The dielectric is then covered with a counter electrode and then a layer of carbon and silver.

The solid counter electrode layer represents a balance between adequate conductivity (to provide electrical connection between the dielectric layer and the carbon/silver) and insulation (i.e., sealing off defects in the dielectric layer that would otherwise cause a short circuit between the anode and the electrode). Commercial usage requires that these functions be performed with a leakage current that is less than 1% of the product of the voltage and the capacitance (in microfarads), i.e., <0.01 CV. Leakage currents are thought to result from pinhole surface defects that allow current to flow through the dielectric layer.

One material that is typically used as the solid counter electrode is manganese dioxide. Although somewhat low in conductivity, manganese dioxide becomes an electrical insulator when a defect causes a short and localized heating near the defect site. To offset the conductivity, manganese dioxide is often mixed with an electrically conductive organic complex. See, U.S. Pat. No. 5,567,209.

Manganese dioxide is formed as a solid electrolyte on the surface of the anodic oxide film by impregnating the anode with manganese nitrate, thermally decomposing the nitrate to the oxide, and reforming the anode. The purpose of the reformation is to lower the leakage current in a controlled manner. Typically, the reformation is performed with manganese dioxide at conditions that include an applied voltage that is less than 50–55% of the initial formation voltage.

In an effort to find a solid electrolyte with a lower resistivity, manganese dioxide has been replaced with an electrically conductive, film forming organic material (e.g., polyacetylene, poly-p-phenylene, polypyrrole, polythiophene, and polyaniline and their derivatives) either with or without a dopant material. See U.S. Pat. Nos. 5,567,209 and 5,436,796 the disclosures of which are herein incorporated by reference.

U.S. Pat. No. 5,567,209 repeatedly impregnates a tantalum capacitor with a polyaniline salt monomer solution followed by a polymerization step. A carbon or graphite paste may also be applied. Example 1 shows a formation voltage of 48 V, and example 2 identifies a formation voltage of 13 V. None of the examples uses a reformation voltage.

U.S. Pat. No. 5,436,796 describes a solid electrolytic capacitor that uses an electrically conductive composite film containing a reduced polyaniline and 10–300% of a second polymer. The second polymer is said to help reduce leakage current from the polyaniline alone (0.1–0.5 CV) to 0.001 CV or less. The polymeric film is formed on the anode surface, washed of by-products, dried at elevated temperature, and imprinted with an electrode pattern. Examples 2–4 show that applying a reformation voltage to the formed capacitive element at 70% of the formation voltage under an atmosphere of 90% relative humidity reduced the leakage current value of the capacitor.

It would be useful to have an efficient manufacturing process for capacitive elements containing a polymeric electrolyte that could be readily integrated into an existing manufacturing line without significant capital expenses.

SUMMARY OF THE INVENTION

It is an objective of the invention to provide a process for making capacitive elements that include an electrically conductive, polymeric solid counter electrode with reduced leakage current than is currently available.

It is another objective to make such capacitors with only minor changes to a manufacturing line and without significant capital expenses.

In accordance with this and other objectives of the present invention that will become apparent from the description herein, capacitor elements of the present invention are made by a process that includes the following steps:

a. subjecting an anode body of sintered valve metal powder to a formation current at a first voltage in a first electrolyte solution;

b. coating the anode with an electrically conductive, polymeric, solid electrolyte;

c. reforming the polymer-coated anode by suspending the polymer-coated anode in a second electrolyte solution and applying a reformation voltage that is within the range of about 60%–85% of the voltage of said formation voltage; and d. repeating steps b and c at least two times.

The reformation step c. may be repeated a number of times with 3–4 repetitions being sufficient in standard manufacturing to form a capacitor having an electrically conductive solid electrolyte with reduced leakage current properties. After step d, the anode is completed by applying an outer polymer layer and then forming an electrode pattern.

DETAILED DESCRIPTION OF THE INVENTION

Capacitor elements of the present invention are made from valve metal powders that are sintered, formed at a formation voltage, coated with an electrically conductive polymer, reformed at a reformation voltage that is about 60–85% of the formation voltage, coated/reformed at least two more times, and finished. The high reformation voltage and relatively aggressive reformation conditions between layers during the formation of the polymeric coating results in a polymer-based capacitor element that exhibits a reduced current leakage value compared to currently available polymer-containing capacitive elements.

Figure 1:
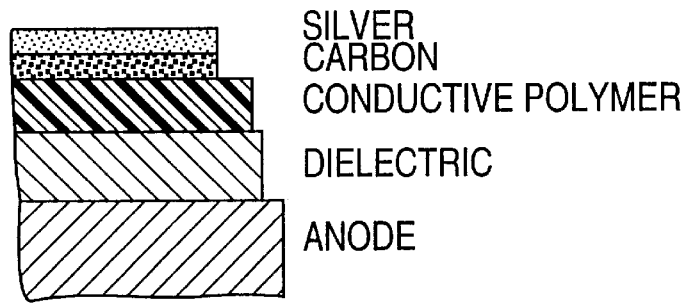
FIG. 1 illustrates the layers of a typical capacitive element.

FIG. 1 illustrates the layers of a typical capacitive element. An anode prepared from a sintered valve metal powder is covered with a dielectric layer, which in turn is covered with a conductive polymer. An electrode pattern is applied to the top of the solid electrolyte with silver and carbon.

Figure 2:
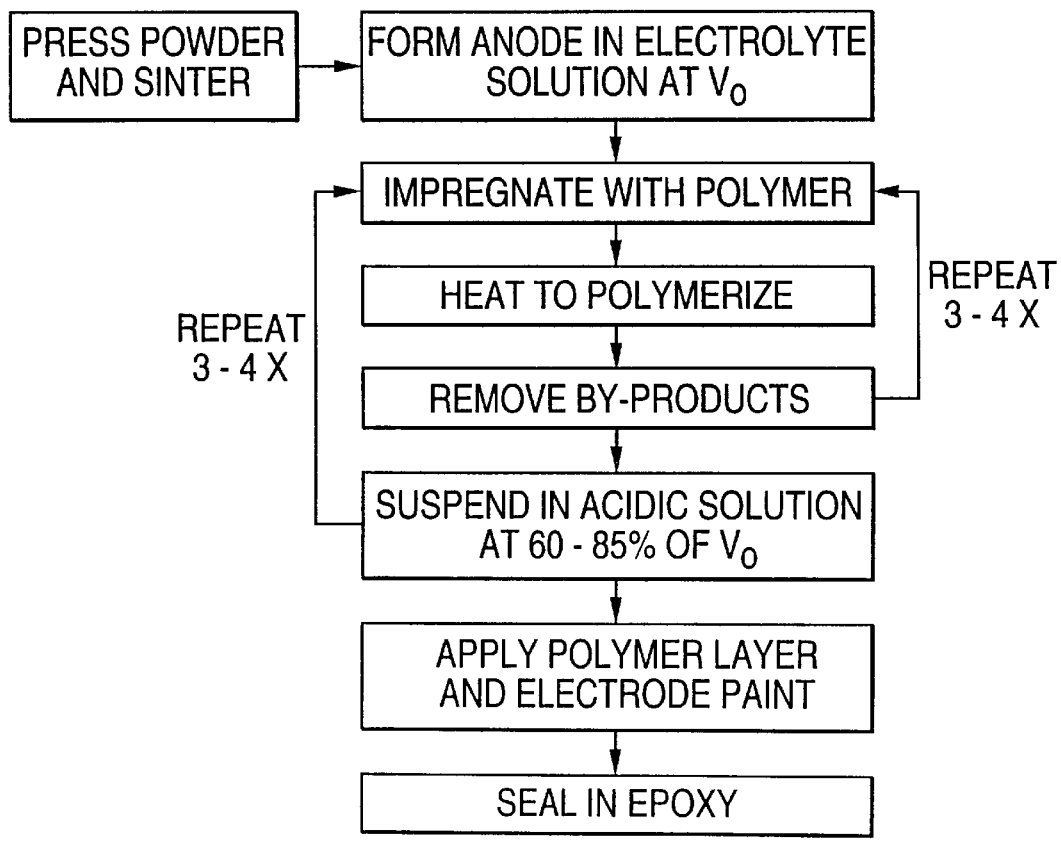
FIG. 2 is a flow diagram of a preferred process according to the invention.

FIG. 2 is a flow diagram of a preferred process according to the present invention. An anode is prepared in accordance with known methods. Typically the anode is formed from a sintered pressed powder which is placed in an electrolyte solution and subjected to a formation voltage.

The anode is then impregnated with a monomer and oxidizer/dopant and heated until the monomer polymerizes. The by-products are removed. The impregnation, polymerization, and by-products removal steps are repeated, preferably about 3 to 4 times. Then the anode is placed in an acidic solution and a reformation voltage is applied which is about 60 to 85% of the formation voltage. The anode is then subjected to the repeated impregnation, polymerization, and by-products removal steps and the reformation step several more times.

Finally, a polymer layer and carbon and silver paint are applied to the anode. The final product is sealed in epoxy.

The valve metals from which the capacitive elements are formed are preferably aluminum, tantalum, or niobium. Appropriate powder sizes are within the range of 0.5 to 5 microns. These powders are pressed with or without a binder to form a green anode body having a density of about 30–70% theoretical density. The green body is then sintered at a temperature within the range from about 1250° C. to about 1500° C.

The sintered anode is then "formed" into an anode body by suspending the sintered body in an aqueous electrolyte solution at a formation voltage of about 3–4 times the rated voltage of the element. For example, a typical part rated at 10 volts is formed at 30–40 volts, usually 35 volts. Suitable aqueous electrolyte solutions include phosphoric acid or ammonium nitrate with or without thickening agents, solvents, co-solvents, surfactants, or other conventional additives.

Once formed, the anode is coated with one or more layers of an electrically conductive polymer that may or may not be doped. Suitable polymers include polyaniline, polythiophene, polyfuran, and polypyrrole and their derivatives. The most preferred polymer is poly(3,4-ethylenedioxythiophene).

The polymer is formed by the reaction of the appropriate monomer and an oxidizing agent. Suitable monomers include aniline, thiophene, furan, and pyrrole, preferably 3,4-ethylenedioxythiophene. Suitable oxidizing agents include $Fe^{3+}$, $Ce^{4+}$, hydrogen peroxide, and persulfate Suitable/dopants that can be combined with the electrically conductive polymer include anions of moderately strong to strong acids. Examples include, but are not limited to, anions of sulfonic acids (e.g., toluenesulfonic acid, dodecylbenzenesulfonic acid, and camphorsulfonic acid), and carboxylic acids (e.g., acetic acid and oxalic acid). A preferred anion is toluene sulfonate. The monomer and optional oxidizing agent are dissolved in a solvent such as, but not limited to alcohols, such as butanol, isopropanol, and mixtures thereof The solution is then heated to polymerize the monomers. Heating is generally performed at a sightly elevated temperature that is sufficient to polymerize the monomers without adversely affecting the properties of the anode. Suitable polymerization temperatures are within the range from about 20° C. to about 120° C, preferably about 25 to about 70.

After heating, there may be residual monomer or by-product materials that are undesirable in the final capacitive element. Such materials are readily removed by washing with water, solvents, and/or surfactants.

The polymerization is repeated any number of times to build up the desired amount of polymer. In general, the film is built up with 3–4 repetitions of the impregnation, heating, and washing steps.

Once formed, the polymer-coated anode is reformed in acidic solution with an applied DC voltage that is 60–85%, preferably 68–75%, of the DC voltage initially applied when the anode was formed. The acids are preferably the organic acids whose anions were used as dopants in the polymer, e.g., toluenesulfonic acid, dodecylbenzenesulfonic acid, and camphorsulfonic acid. Other suitable acids include phosphoric, sulfuric, and nitric acids.

The reformed capacitive element is then finished to make a stock part. Finishing typically entails applying an outer coating of the doped solid counter electrode polymer, and then applying an electrode pattern layer formed from carbon and silver. Finally, the anode is attached to a lead frame and then sealed with a nonconductive material, such as epoxy.

The following examples are presented to illustrate the invention and are not intended to serve as limitations on the scope of the attached claims.

EXAMPLES

Example 1

A tantalum anode was pressed, sintered, and formed at 35 volts and 80° C. in a phosphoric acid electrolyte solution. The capacitance of the anode was 47 $\mu f$ (control).

The anode was then impregnated by dipping into a solution containing 3,4-ethylenedioxythiophene and iron toluene sulfonate in a solvent of butanol and isopropanol. The anode was placed in an oven, heated to 65° C. to form the conductive polymer poly(3,4-ethylenedioxythiophene) (PEDT), and washed of by-products. This sequence was repeated 3 more times to make a layer of PEDT that is suitably thick. The PEDT-coated anode was attached to leads and suspended into a 1% solution of toluenesulfonic acid for 15 mins. at an applied potential of 24 volts (69a of formation voltage). This sequence was repeated three more times to make a total of four layers of PEDT with a reformation step between each layer.

To the outside of the coated and reformed anode was applied a PEDT dispersion and silver electrode paint.

Example 2

The process of Example 1 was repeated except that no reform treatments were done to the anode.

Example 3

The process of Example 1 was repeated except that the voltage during reform for each step was 17 volts (49% of formation voltage) in 1% phosphoric acid.

Table 1 reports the capacitance, dissipation factor (DF), equivalent series resistance (ESR), and leakage current for the resulting capacitors from Examples 1–3.

TABLE 1

| Example | Capacitance ($\mu f$) | DF (%) | ESR (ohms) | Reform/Initial Voltage (%) | Leakage ($\mu A$) |
|---|---|---|---|---|---|
| control | 47 | — | — | — | — |
| 1 | 44 | 2.3 | 0.13 | 69 | 3.4 |
| 2 | 43 | 2.3 | 0.16 | 0 | 619 |
| 3 | 43 | 2.6 | 0.14 | 49 | 35.7 |

As seen from Table 1, the reform treatments of the present invention at 24 volts produced a leakage current within acceptable limits (e.g., 4.7 $\mu A$) while maintaining capacitance, DF, and ESR. The non-reformed anode had poor leakage results and higher ESR. The anode which was reformed at 17 volts (49% of the formation voltage) had better leakage than the non-reformed anode but still significantly poorer results than the anode at 24 volts. The DF value was also higher than the 24 volt anode.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A process for making capacitive elements including the steps of:
   a. subjecting an anode body of sintered valve metal powder to a formation current at a first voltage in a first electrolyte solution;
   b. coating the anode with an electrically conductive, polymeric, solid electrolyte;
   c. reforming the polymer-coated anode by suspending the polymer-coated anode in a second electrolyte solution and applying a reformation voltage that is within the range of about 60%–85% of the voltage of said formation voltage; and
   d. repeating steps b and c at least two times.

2. A process according to claim 1 wherein said anode body is made of tantalum.

3. A process according to claim 1 wherein said first electrolyte solution comprises phosphoric acid or ammonium nitrate.

4. A process according to claim 1 wherein said electrically conductive, polymeric, solid electrolyte is selected from the group consisting of a polyaniline, a polythiophene, a polyfuran, and a polypyrrole.

5. A process according to claim 4 wherein said solid electrolyte is poly(3,4-ethylenedioxythiophene).

6. A process according to claim 1 wherein the coating step b comprises dipping the anode in a solution comprising a monomer, an optional oxidizer, and a solvent, and then heating the solution to about 20 to 120° C. to polymerize the monomers.

7. A process according to claim 6 wherein step b is repeated at least twice prior to step c.

8. A process according to claim 7 wherein step b is repeated 3 to 4 times.

9. A process according to claim 6 wherein the monomer is selected from the group consisting of an aniline, a thiophene, a furan, and a pyrrole.

10. A process according to claim 1 wherein said second solution comprises toluenesulfonic acid.

11. A process according to claim 1 wherein in step c wherein the reformation voltage is within the range of 68%–75% of the voltage of said formation voltage.

12. A process according to claim 1 further comprising
   e. applying an outer coating of the electrically conductive, polymeric, solid electrolyte and then forming an electrode pattern.

13. A process according to claim 12 further comprising
   f. applying a sealant.

14. A process according to claim 13 wherein the sealant is epoxy.

15. A process according to claim 1 wherein the formation voltage is between about 30 and 40 volts.

* * * * *